US008458146B2

(12) United States Patent
Jones et al.

(10) Patent No.: US 8,458,146 B2
(45) Date of Patent: Jun. 4, 2013

(54) ACCESSING DATA REMOTELY

(75) Inventors: Gareth Edward Jones, Hampshire (GB); Matthew Robert Whitehead, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/556,599

(22) Filed: Sep. 10, 2009

(65) Prior Publication Data

US 2010/0077303 A1    Mar. 25, 2010

(30) Foreign Application Priority Data

Sep. 11, 2008 (EP) ..................................... 08164160

(51) Int. Cl.
*G06F 17/30* (2006.01)

(52) U.S. Cl.
USPC ........................................... 707/693; 715/700

(58) Field of Classification Search
USPC ................. 707/826, 785, 7, 103, 830, 1, 100, 707/693, 797, 201, 648
See application file for complete search history.

(56) References Cited

U.S. PATENT DOCUMENTS

| | | | | |
|---|---|---|---|---|
| 5,761,670 A * | 6/1998 | Joy | ........................................ | 1/1 |
| 6,389,419 B1 * | 5/2002 | Wong et al. | .................... | 709/245 |
| 6,526,424 B2 * | 2/2003 | Kanno et al. | .................... | 715/229 |
| 6,553,392 B1 * | 4/2003 | Mosher et al. | ........................ | 1/1 |
| 6,651,071 B1 * | 11/2003 | O'Brien et al. | ........................ | 1/1 |
| 6,978,272 B1 * | 12/2005 | Ellmann et al. | ........................ | 1/1 |
| 7,043,486 B2 * | 5/2006 | Cope | ........................................ | 1/1 |
| 7,107,283 B2 * | 9/2006 | Seifi | ............................... | 707/797 |
| 7,188,118 B2 * | 3/2007 | Borthakur et al. | ............. | 707/693 |
| 7,213,039 B2 * | 5/2007 | Ramanujam | ............................ | 1/1 |
| 7,571,195 B2 * | 8/2009 | Billingsley et al. | .................... | 1/1 |
| 7,690,000 B2 * | 3/2010 | Farmer | ........................... | 719/318 |
| 7,809,778 B2 * | 10/2010 | Mitaru | ............................ | 707/826 |
| 7,818,354 B2 * | 10/2010 | Kuramoto et al. | ............. | 707/830 |
| 7,966,298 B2 * | 6/2011 | Bruso et al. | .................... | 707/675 |
| 8,005,795 B2 * | 8/2011 | Galipeau et al. | ............. | 707/648 |
| 2003/0097381 A1 * | 5/2003 | Detweiler et al. | ............. | 707/201 |
| 2005/0071194 A1 * | 3/2005 | Bormann et al. | ................. | 705/2 |
| 2007/0005416 A1 * | 1/2007 | Jackson et al. | .................. | 705/14 |
| 2007/0016627 A1 * | 1/2007 | McCaw | ........................ | 707/201 |
| 2009/0254511 A1 * | 10/2009 | Yeap et al. | ........................ | 707/1 |

OTHER PUBLICATIONS

Brad Neuberg, "AJAX: How to Handle Bookmarks and Back Buttons", ONJava.com, Oct. 26, 2005; downloaded at http://www.onjava.com/pub/a/onjava/2005/10/26/ajax-handling-bookmarks-and-back-button.html?page=1.

(Continued)

*Primary Examiner* — James Trujillo
*Assistant Examiner* — Thong Vu
(74) *Attorney, Agent, or Firm* — Thomas E. Lees, LLC

(57) ABSTRACT

A method, apparatus and computer program product to operate a device to access data remotely is described. The processing method includes connecting to a remote data source and transmitting data requests to a remote data source. The device receives responses to the data requests, the responses include data and a flag indicating a status of store, reset or ignore with respect to the respective data request. The device stores the data request in an ordered record when the respective flag is indicating a status of store or reset. Storing a data request in the ordered record may further comprise storing in the record the respective flag, when the respective flag is indicating a status of reset.

18 Claims, 6 Drawing Sheets

OTHER PUBLICATIONS

FieldExpert.com; "Ajax Best Practices: Don't Break Bookmarks", Jan. 4, 2006, retrieved from http://web.archive.org/web/20070120131256/ by entering the following URL: http://www.fieldexpert.com/2006/01/04/ajax-best-practices-dont-break-bookmarks/.

Greg Murray, "AJAX FAQ for the Java Developer", Oct. 14, 2005, Java.net, downloaded at http://weblogs.java.net/blog/gmurray71/archive/2005/10/ajax_faq_for_th.html.

* cited by examiner

ACCESSING DATA REMOTELY

FIELD

Embodiments of this invention relate to a method of operating a device, and to the device itself. In one embodiment, the invention can be used to provide AJAX server-side bookmarking support.

BACKGROUND

The Internet is a global system of interconnected computer networks that allow communication and the interchange of data through packet switching using the standardized Internet Protocol (IP) Suite. The Internet carries various information resources and services, such as email, online chat, file transfer and file sharing, online gaming, and the hypertext documents and other resources provided by websites. A web browser is a software application which enables a user to display and interact with text, images, videos, music and other information located on a website on the Internet. Text and images on a page within a website can contain links to other pages at the same or different website. Web browsers allow a user quickly and easily to access information provided on pages of websites by using such links.

A common feature that is implemented by many web browsers is the ability to bookmark pages of websites. Every website is located by its URL (Uniform Resource Locator), and individual pages of each website will have a unique address, stemming from the URL. If a user has a specific page of a website that they visit frequently, then they can bookmark that page in the web browser. The web browser effectively stores the relevant webpage address for later recall. This allows the user to shortcut to that page without having to memorise or retype the address of the individual web page. The bookmarked page could be the home page of the website, defined as www.example.com, or could be page within the website, defined as www.example.com/page1. The naming of pages conforms to well-defined principles.

It is also the case that many web browsers also include a navigation function provided by "back" and "forward" buttons. These buttons allow the user to shortcut to previously visited pages, without having to retype the page addresses. In the sample addresses given above, if the user first navigates to the www.example.com homepage, and then accesses a link on that homepage that takes them to www.example.com/page1, they can use the "back" button to return to the homepage, and having done so, can use the "forward" button to move to the "page 1" page of the website. This functionality is provided through the web browser recording the pages that the user accesses, in order, as a background task. This store of visited page addresses can be accessed as and when the user navigates using the "back" and "forward" buttons.

However, advances in web page technology have adversely affected some of the standard web browsing functions, such as bookmarking and use of the navigation buttons. One such technology is AJAX, (asynchronous JavaScript (Java and all Java-based trademarks and logos are trademarks of Sun Microsystems, Inc. in the United States, other countries, or both) and XML), which refers to a group of interrelated web development techniques used for creating interactive web applications. Using Ajax, web applications can retrieve data from a remote source asynchronously in the background without interfering with the display and behaviour of the displayed page. The end user is probably unaware that such a technology is in use on the web page that they are currently viewing. It is not obvious to the user that requests and responses are taking place behind the scenes while they are accessing a function on a web page.

An example of the type of function provided via AJAX might be a section of a webpage that allows a user to move around a map, for example zooming in on objects and clicking on them for further information, as provided by "yellow pages" type websites. To the user, it feels as if they are navigating between web pages, when in fact they are still on the same page, but actually navigating the specific AJAX application. The result of this is that should the user press the "back" button, they will not go back to the previous view of the page (which is what they are expecting) but actually navigate away from the page entirely. Similarly, if a user were to access an AJAX application, then store the page as a bookmark, when they later return to the page they will not see the view that they are expecting, as they will be presented with the web page with the AJAX application in its starting configuration, without reflecting any of the previous navigation of that application.

SUMMARY OF AN EMBODIMENT OF THE INVENTION

According to a first aspect of the present invention, there is provided a method of operating a device comprising connecting to a remote data source, transmitting data requests to the remote data source, receiving responses to the data requests, the responses comprising data and a flag indicating a status of store, reset or ignore with respect to the respective data request, and storing a data request in an ordered record when the respective flag is indicating a status of store or reset.

According to a second aspect of the present invention, there is provided a device comprising a communication component arranged to connect to a remote data source, to transmit data requests to the remote data source, and to receive responses to the data requests, the responses comprising data and a flag indicating a status of store, reset or ignore with respect to the respective data request, a processor arranged to create an ordered record in which is stored a data request when the respective flag is indicating a status of store or reset, and a storage component arranged to store the ordered record.

According to a third aspect of the present invention, there is provided a computer program product on a computer readable medium for operating a device, the product comprising instructions for connecting to a remote data source, transmitting data requests to the remote data source, receiving responses to the data requests, the responses comprising data and a flag indicating a status of store, reset or ignore with respect to the respective data request, and storing a data request in an ordered record when the respective flag is indicating a status of store or reset.

According to a fourth aspect of the present invention, there is provided a method of operating a server comprising connecting to a remote device, receiving data requests from the device, and transmitting responses to the data requests, the responses comprising data and a flag indicating a status of store, reset or ignore with respect to the respective data request.

According to a fifth aspect of the present invention, there is provided a server comprising a communication component arranged to connect to a remote device, to receive data requests from the device, and to transmit responses to the data requests, the responses comprising data and a flag indicating a status of store, reset or ignore with respect to the respective data request.

According to a sixth aspect of the present invention, there is provided a computer program product on a computer readable medium for operating a server, the product comprising instructions for connecting to a remote device, receiving data requests from the device, and transmitting responses to the data requests, the responses comprising data and a flag indicating a status of store, reset or ignore with respect to the respective data request.

Preferably, there is provided a system in which the client device that accesses data stored on a remote data source (such as a server) has the ability to, for example, bookmark pages that include AJAX calls, by allowing the server (to which the device is connected) to provide information to the device's browser, per AJAX call, to help the device determine how to store the bookmark. The information the server may provide per AJAX call could include the following, if the call is bookmarkable, and if the call replaces all/any previous calls. This provides a simple method of achieving bookmarking of web pages that use techniques such as AJAX, in a manner that is easy to implement for the designer of the web page. The method also allows the navigation buttons in the web browser to be used, in a manner that is in line with the user's expectation of their operation, even when the web site being navigated uses applications such as AJAX applications on the individual web pages.

Preferably, the step of storing a data request in the ordered record further comprises storing in the record the respective flag, when the respective flag is indicating a status of reset. By recording those data requests (calls) in the ordered record with the flag, when the flag indicates a reset, then the functionality of the ordered record is increased. The requests stored by the record have additional meaning, because it is now possible to see which request is the last request with a reset flag, for example. This is useful in the context of creating a bookmark and in using the navigation buttons. It can be assumed that all other data requests stored in the record are simple "store" status requests, whether this is explicitly saved in the ordered record or not.

In one embodiment, the process further comprises receiving a defined user input requesting creation of a bookmark, and storing a file comprising a resource locator for the remote data source and the data requests in the ordered record from the last stored data request for which the respective flag was indicating a status of reset. The creation and management of the ordered record supports the creation of a sensible and effective bookmark file, which consists of the URL of the current web page plus all of the data requests back to and including the last data request that is marked as a "reset" status. This means that when the user accesses that bookmark at some future time, the URL will position them to the correct page, and the data requests in the bookmark file can be resent to navigate the (AJAX) application to the point at which the user originally requested the creation of the bookmark. The point of the reset (and the ignore status) is that pointless and irrelevant calls will not be made based upon actions taken by the user when they originally navigated the web page and application embedded in that page.

In a further embodiment, the process further comprises receiving a defined user input requesting navigation of the remote data source, and accessing the data requests in the ordered record from the last stored data request for which the respective flag was indicating a status of reset, to perform the navigation. In a similar fashion to the creation of the bookmark outlined above, the ordered record can also be used to restore the "back" function on the browser user interface to the functionality that the user will expect. When a user presses "back" for example, the browser will be able to reprocess the data requests in order from the last reset status data request, to return the embedded application to the penultimate position, as the user would expect.

BRIEF DESCRIPTION OF THE DRAWINGS

Embodiments of the present invention will now be described, by way of example only, with reference to the accompanying drawings, in which.

DETAILED DESCRIPTION

Figure 1:
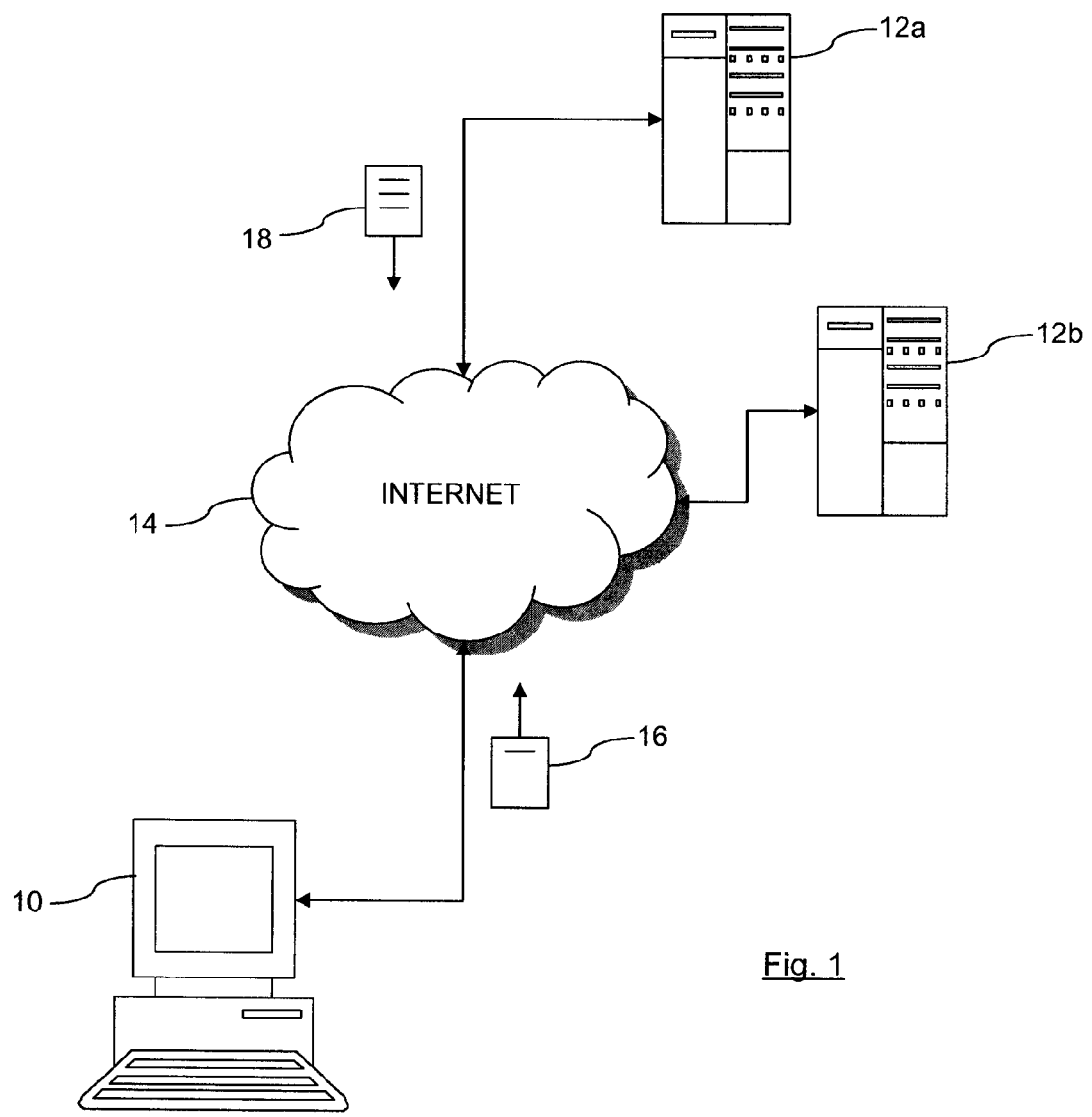
FIG. 1 is a schematic diagram of a system in which a client device is connected to a remote data source via the Internet.

A schematic diagram of a client device 10 connecting to remote data sources 12, via the Internet 14, is shown in FIG. 1. The client device 10 is a conventional computer that is connecting to a remote data source 12a, such as a server 12. The client device 10 includes the conventional components of processor, communication component, storage component and user interface devices such as a display, keyboard and mouse.

The server 12 is hosting one or more websites, which the user of the client device 10 can access via a suitable web browser running on their computer 10. The user will browse a website by making on-screen actions, such as clicking links or buttons, using a user interface device such as a mouse. The web browser will also provide the functions, discussed above, of bookmarking and "back" and "forward" navigation, which makes the user's experience of the web browsing more efficient.

In general, when a user performs a navigation action, through the graphical user interface of their web browser, then a data request 16 is transmitted from the client device 10 to the remote data source 12a. The construction and routing of the request 16 is handled by the web browser, which is in two-way communication with the website hosted by the server 12a. If a user clicks on a link in a webpage, then this link has a new URL associated with it, and the data request 16 comprises the new URL, which is sent to the remote data source 12. The server 12 sends a response 18 back to the client device 10, which in this example will constitute the content of the requested page. For ease of understanding, the request 16 and response 18 are shown as single unique items, but in reality will be made up of numerous small packets, as per the TCP/IP protocol used for Internet communication.

It is now common for web pages to have, effectively, applications contained within them, for example, as per the AJAX technology, discussed above. One or more portions of the web page viewed by the user in the interface to their browser will be running an application. As the user interacts with the application, data requests 16 will still be going back to the server 12, and responses 18 will be returned to the client device 10, but the data requests 16 will be calls within the application, rather than URLs requesting new web pages. The data requests 16 will still be the same kind of HTTP requests that are used to request new web pages and they will still have a URL associated with the request. In relation to a technology such as AJAX, the difference is that the request 16 is not for the entire page (and hence the URL in the address bar does not change), the request 16 is made in the background and the response 18 is usually data rather than HTML (although sometimes HTML fragments are returned).

Figure 2:
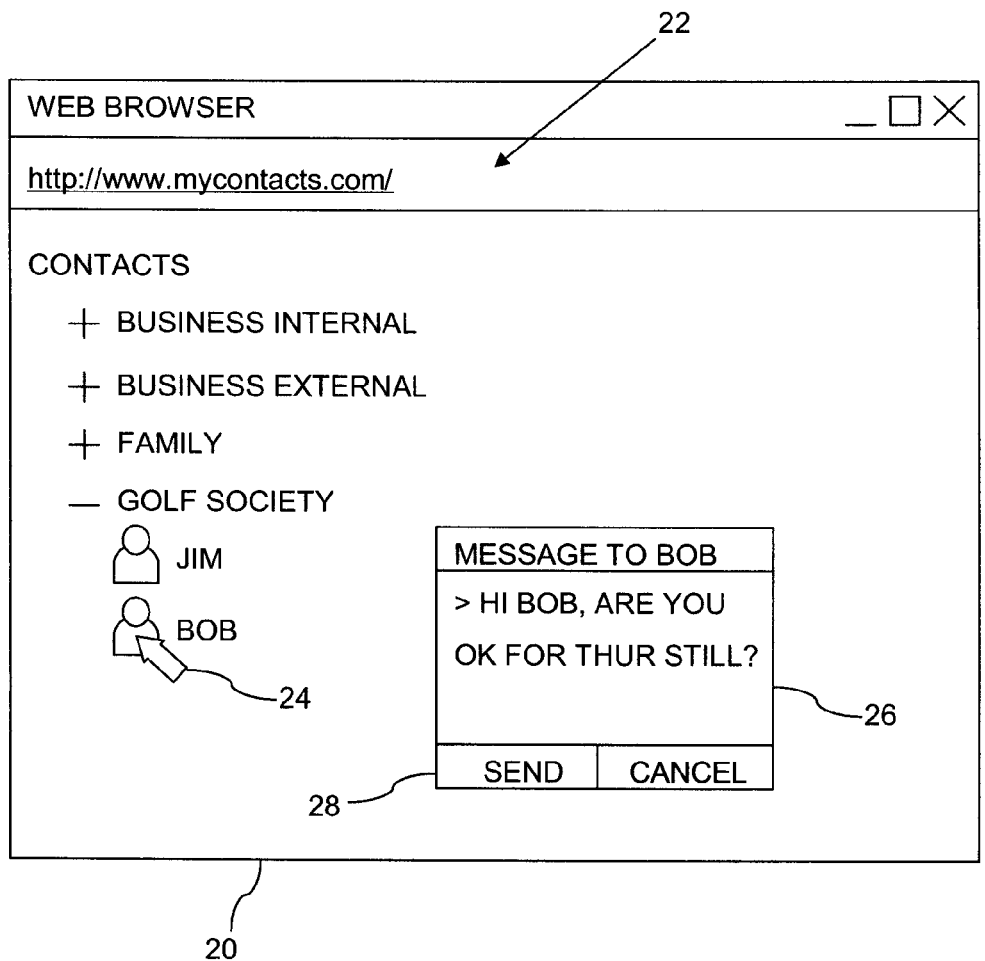
FIG. 2 is a schematic diagram of a graphical user interface of a web browser.

FIG. 2 shows an example of a graphical user interface 20 to the web browser being run by the client device 10. In the following example, a user opens a web page that displays information about a number of contacts in a hierarchical tree (http://www.mycontacts.com/). This web page is used for example purposes within the context of explaining embodiments of present invention, and is not meant to represent a real web page. The tree comprises four groupings of contacts, being business internal, business external, family and golf society. The user has arrived at this page by typing the URL into the address bar 22, but could equally have navigated to the web page using a conventional bookmark. The functionality provided by the web page is delivered by an AJAX application, and the user actions on the web page will generate calls within that AJAX application.

The user expands a particular branch of the tree to display a number of contacts. The user has carried out this action by clicking on a "+" icon next to the "golf society" contact branch, which has changed the icon to a "−" sign, and expanded the list of contacts in the branch. This action by the user involves an AJAX call from the client device 10 to the server 12 which is hosting the website. (http://www.mycontacts.com/?node=4). The user has then clicked on a contact in the tree, as indicated by the mouse pointer 24, which is to send a message to that contact. The action of clicking on the contact Bob has opened a Javascript dialog box 26, and the send button 28 makes a further AJAX call (http://www.mycontacts.com/?action=send&contact=5&message=hello).

Figure 3:
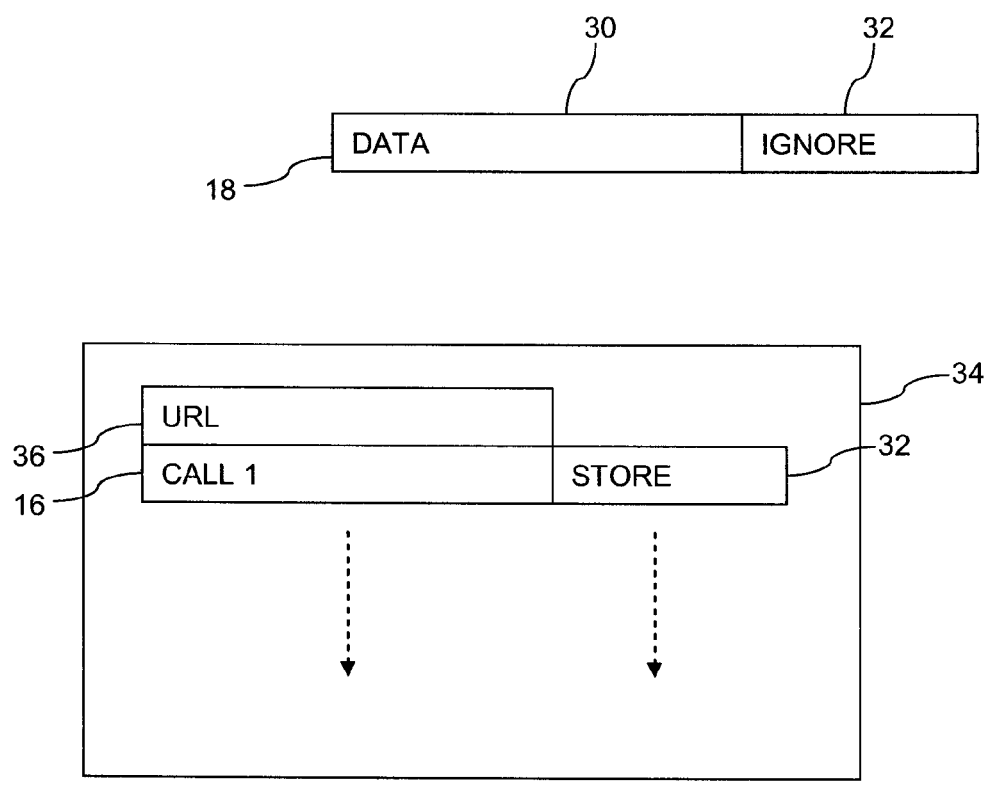
FIG. 3 is a schematic diagram of a data response and an ordered record.

In one embodiment, the invention delivers a system that allows the use of bookmarks and the navigation buttons in the browser, in a manner that matches the user's expectations, by adapting the client device 10 and server 12 operations. The system will continue to function, even if the web page is using an application such as an AJAX application. How this is achieved is illustrated in FIG. 3, which shows schematically a response 18, being a response 18 to the data request 16, which was the call from the AJAX application to send the message to Bob. The response 18 comprises data 30 and a flag 32 indicating a status of store, reset or ignore with respect to the respective data request 16. In this case, the flag status is "ignore". The "ignore" status may be implicit rather than explicit, i.e. with an absence of any flag indicating that the call should be ignored, On the client side, there is maintained an ordered record 34. The client device 10 is arranged to store a data request 16 in the ordered record 34 when the respective flag 32 is indicating a status of store or reset. In this example, the first call, which was the call to expand the tree, came back with a "store" flag, and so the original call plus the flag was stored in the record 34. The record 34 also includes the resource locator 36 for the current website.

Using the system disclosed above, the server 12 would inform the client device 10 that the first AJAX call is to be stored, but that the second call is not and a combined bookmark of http://www.mycontacts.com/ plus the following AJAX call http://www.mycontacts.com/?node=4 can be created from the record 34. This system of recording a selection of the calls, as instructed by the server 12, also has the advantage of aiding browser back/forward navigation where AJAX calls are concerned, by storing each possible bookmark as part of the standard navigation procedure.

Web application designers must decide for each AJAX call that will be generated by the specific application, whether the call should be included as part of the record 34 or not. The designer should then set a custom header in the HTTP response, to contain the flag 32, such as 'x-ajax-bookmarkable=true' where the default is false. Any AJAX calls that would mean all previous AJAX calls are no longer relevant could include the header 'x-ajax-clearhistory=true'. If an AJAX call might only replace some previous AJAX calls, they could each be provided with an identifier in the header and the x-ajax-clearhistory header could be specified with a list of IDs that are no longer relevant.

The use of the above techniques in respect of bookmarks is now described with reference to FIGS. 4 and 5. When the client device 10 receives a defined user input requesting the creation of a bookmark, there is stored a file which comprises the resource locator 36 for the remote data source and the data requests 16 in the ordered record 34 from the last stored data request 16 for which the respective flag 32 was indicating a status of reset.

Figure 4:
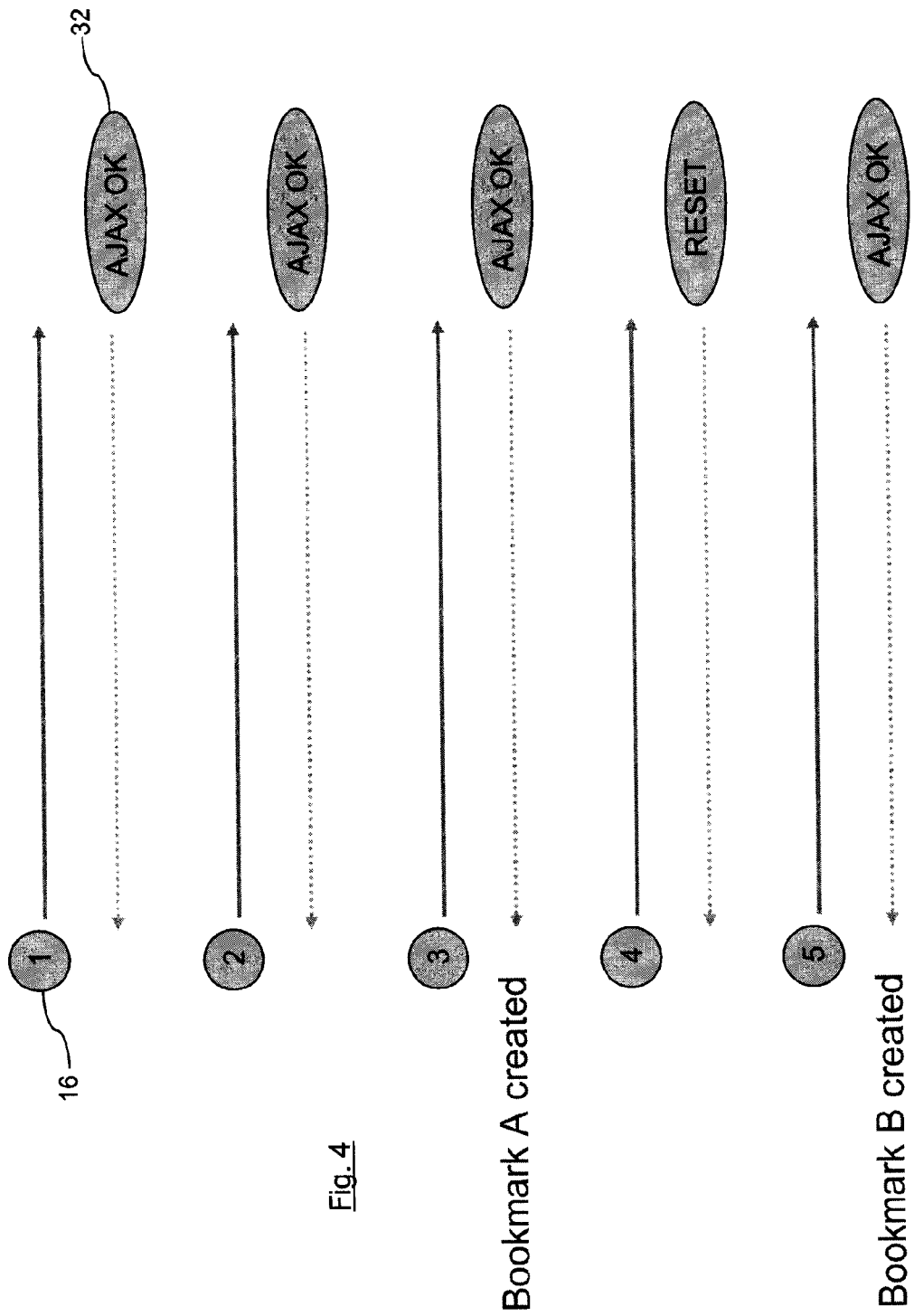
FIG. 4 is a schematic diagram of data requests and respective response flags.
Figure 5:
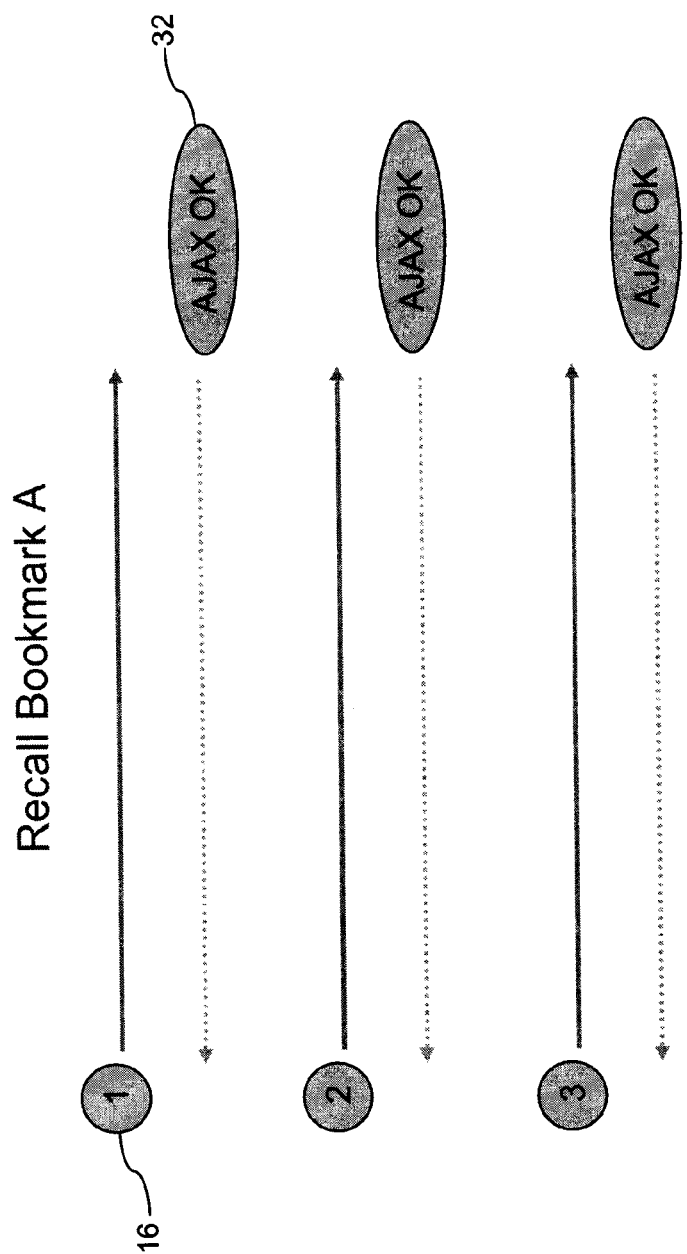
FIGS. 5 and 6 are schematic diagrams showing actions taken following a user selection of a bookmark.

FIG. 4 represents a user accessing a website which is using an AJAX application within a web page. The user has made five calls 16, in order, corresponding to specific user interactions in relation to the AJAX application being run on the web page. In addition to the data 30 in the responses 18, which have been received back from the remote data source 12, respective flags 32 have also been included within those responses 18. The user is unaware of the existence of the flags 32; they are captured in the background by the web browser being run by the client device 10. The flags are used by the client device 10 in determining whether to store the call 16, originally made, which received the respective response 18.

In this example, the response 18 to the third call 16 included a reset flag 32. Depending upon the configuration of the browser in relation to the creation of the record 34, the step of storing a data request 16 in the ordered record 34 further comprises storing in the record 34 the respective flag 32, when the respective flag 32 is indicating a status of reset or comprises clearing the content of the ordered record 34 when the respective flag 32 is indicating a status of reset. For example, in an AJAX application that has a query interface, then the entry of a new query could be considered as a reset action.

In the example of FIG. 4, the user has twice created bookmarks, whilst they have been navigating the application delivered by the website. Bookmark A was created after the third call, and bookmark B was created after the fifth call. The first bookmark A will comprise the URL of the current web page plus the calls 1, 2 and 3, while the second bookmark B will comprise the URL of the current web page plus the calls 4 and 5, as only those data requests 16 that go back to (and include) the last reset status of the response will be used to generate the bookmark.

If the user later wishes to navigate using the saved bookmarks, then the actions taken will be as follows. FIG. 5 illustrates the example of the user selecting bookmark A. The web browser will first navigate to the URL contained within the bookmark, and then repeat the calls 1 to 3, as shown in the Figure. The data requests 16 will be resent to the remote data source 12 (the server 12 hosting the website), which will respond with the relevant responses 18, which will also include the respective flags 32 for those responses 18. The result of this will be that the user is returned to the point in the website that logically corresponds to the original bookmark selection point, without including any unnecessary or misleading actions.

Figure 6:
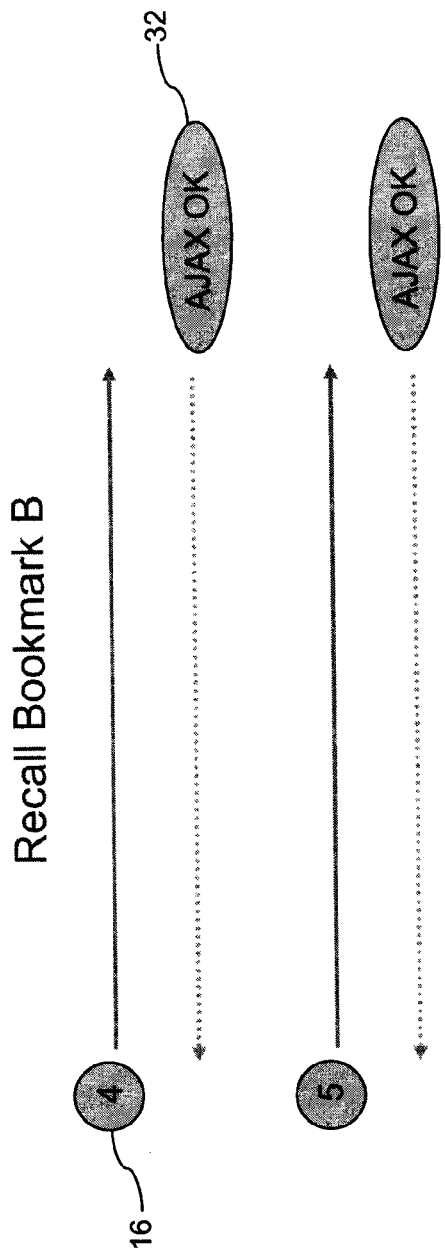

The case for bookmark B is shown in FIG. 6. Here the user has selected bookmark B. As in the example above, the browser will navigate to the URL that is contained within the bookmark, and repeat the calls 4 and 5. These data requests 16 will be resent to the server 12 which is hosting the website. The server 12 replies with the relevant responses 18, which also include the flags 32. The user is thereby returned to the point in the website according to the original bookmark selection, again without including any unnecessary or misleading actions.

The user can create and access bookmarks while being unaware of the recording mechanism that is being operated by the client device 10. The processor of the client device is recording the user's data requests 16 (application calls) as responses 18 come back containing a flag indicating storage, in the record 34, and the record 34 is stored in the client device's local storage component. The record 34 can also be used for navigation at the time of accessing a web page, not just later through bookmarks. For example, if there is received a defined user input requesting navigation of the remote data source, then the processor can be arranged to accessing the data requests 16 in the ordered record 34 from the last stored data request 16 for which the respective flag 32 was indicating a status of reset, to perform the navigation.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments of the present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of operating a device comprising:
   accessing a remote data source;
   transmitting a data request to the remote data source;
   receiving a response to the data request, the response comprising data and a flag indicating a status with respect to the data request; and
   performing, by a processor and while accessing the remote data source:
      appending the data request to an ordered record when the respective flag indicates a status of store; and
      clearing the ordered record and then storing the data request in the ordered record when the respective flag indicates a status of reset.

2. The method of claim 1, wherein storing the data request in the ordered record further comprises storing, in the ordered record, the respective flag, when the respective flag is indicating a status of reset.

3. The method of claim 2, further comprising receiving a defined user input requesting creation of a bookmark, and storing a file comprising a resource locator for the remote data source and the data request in the ordered record from the last stored data request for which the respective flag was indicating a status of reset.

4. The method of claim 1, further comprising receiving a defined user input requesting navigation of the remote data source, and accessing the data request in the ordered record from the last stored data request to perform the navigation.

5. The method of claim 1, wherein appending the data request to an ordered record further comprises storing, in the ordered record, the respective flag when the respective flag indicates a status of store.

6. A device comprising:
   a communication component operable to:
      access a remote data source,
      transmit a data request to the remote data source, and
      receive a response to the data request, the response comprising data and a flag indicating a status of store, reset or ignore with respect to the data request;
   a processor operable to perform, while the device is accessing the remote data source:
      appending the data request to an ordered record when the respective flag indicates a status of store; and
      clearing the ordered record and then storing the data request in the ordered record when the respective flag is indicates a status of reset; and
   a storage component operable to store the ordered record.

7. The device of claim 6, wherein the processor is further operable, when clearing the ordered record and then storing the data request, to store, in the ordered record, the respective flag, when the respective flag is indicating a status of reset.

8. The device of claim 6 further comprising a user interface device operable to receive a defined user input requesting creation of a bookmark, the processor further operable to create a file comprising a resource locator for the remote data source and the data request in the ordered record from the last stored data request for which the respective flag was indicating a status of reset.

9. The device of claim 6 further comprising a user interface device operable to receive a defined user input requesting navigation of the remote data source, the processor further operable to access the data request in the ordered record from the last stored data request for which the respective flag was indicating a status of reset, to perform the navigation.

10. The device of claim 6, wherein the processor is further operable, when appending the data request to an ordered record, to store, in the ordered record, the respective flag when the respective flag indicates a status of store.

11. A computer-readable storage device with executable program code stored thereon, wherein the program code instructs a processor to perform:
   accessing a remote data source;
   transmitting a data request to the remote data source;
   receiving a response to the data request, the response comprising data and a flag indicating a status with respect to the data request; and
   performing, while accessing the remote data source:
      appending the data request to an ordered record when the respective flag indicates a status of store; and
      clearing the ordered record and then storing the data request in the ordered record when the respective flag indicates a status of reset.

12. The computer-readable storage device of claim 11, wherein storing the data request in the ordered record further comprises storing, in the ordered record, the respective flag, when the respective flag is indicating a status of reset.

13. The computer-readable storage device of claim 11, wherein the program further instructs the processor to perform:
   receiving a defined user input requesting creation of a bookmark, and
   storing a file comprising a resource locator for the remote data source and the data request in the ordered record from the last stored data request for which the respective flag was indicating a status of reset.

14. The computer-readable storage device of claim 11 wherein the program further instructs the processor to perform:
   receiving a defined user input requesting navigation of the remote data source, and
   accessing the data request in the ordered record from the last stored data request for which the respective flag was indicating a status of reset, to perform the navigation.

15. The computer-readable storage device of claim 11, wherein appending the data request to an ordered record further comprises storing, in the ordered record, the respective flag when the respective flag indicates a status of store.

16. A computer-implemented method of operating a server comprising:
   accessing a remote device,
   receiving a data request from the device, and
   transmitting, by a processor, a response to the data request, the response comprising data and a flag indicating a status of store, reset or ignore with respect to the data request, wherein:
      the status of store instructs the remote device, while accessing the server, to append the data request to an ordered record; and
      the status of reset instructs the remote device, while accessing the server, to clear the contents of the ordered record and then store the data request in the ordered record.

17. A server comprising a communication component operable to connect to a remote device, to receive a data request from the device, and to transmit a response to the data request, the response comprising data and a flag indicating a status of store, reset or ignore with respect to the data request, wherein:
   the status of store instructs the remote device, while accessing the server, to append the data request to an ordered record; and the status of reset instructs the remote device, while accessing the server, to clear the contents of the ordered record and then store the data request in the ordered record.

18. A computer-readable storage device with executable program code stored thereon, wherein the program code instructs a processor to perform:

connecting to a remote device, receiving a data request from the device, and transmitting a response to the data request, the response comprising data and a flag indicating a status of store, reset or ignore with respect to the data request, wherein:

the status of store instructs the remote device, while accessing the server, to append the data request to an ordered record; and the status of reset instructs the remote device, while accessing the server, to clear the contents of the ordered record and then store the data request in the ordered record.

* * * * *